Nov. 6, 1951 W. A. PUGH, SR 2,573,728
EMERGENCY VEHICLE WHEEL TRUCK
Filed March 2, 1950 2 SHEETS—SHEET 1
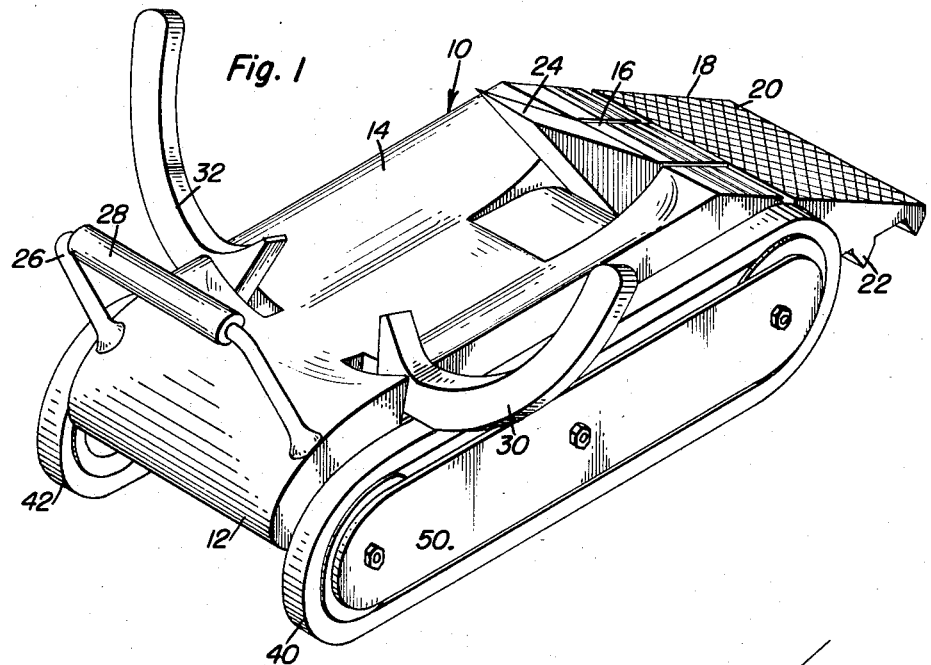
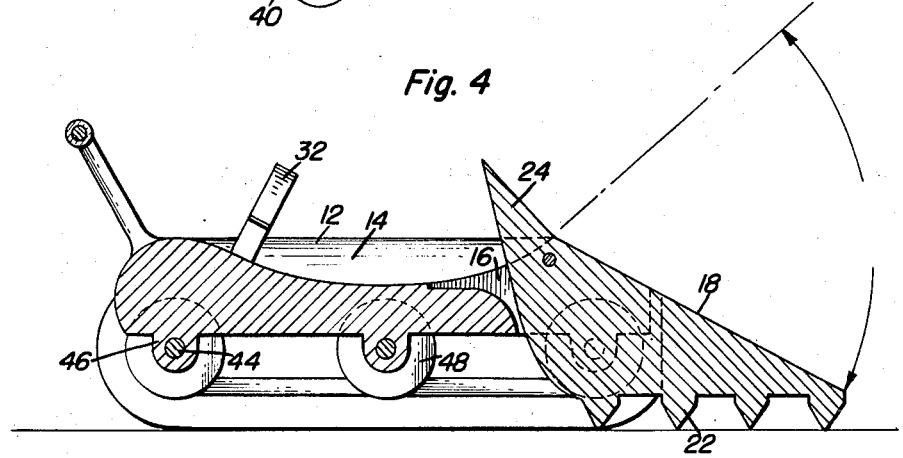
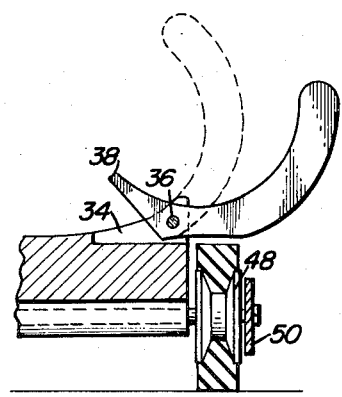
William A. Pugh, Sr.
INVENTOR.

Nov. 6, 1951 W. A. PUGH, SR 2,573,728
EMERGENCY VEHICLE WHEEL TRUCK
Filed March 2, 1950 2 SHEETS—SHEET 2

William A. Pugh, Sr.
INVENTOR.

BY
Attorneys

Patented Nov. 6, 1951

2,573,728

UNITED STATES PATENT OFFICE 2,573,728

EMERGENCY VEHICLE WHEEL TRUCK

William A. Pugh, Sr., Chicago, Ill.

Application March 2, 1950, Serial No. 147,283

1 Claim. (Cl. 214—85)

This invention appertains to wheeled carriages or trucks for supporting the disabled wheel of an automobile, so that the automobile can be driven under its own power from the point of disability to a point where service can be rendered for the deflated pneumatic tire.

The primary object of this invention is to eliminate the hazards, inconvenience and necessity of changing a deflated tire of a vehicle on the highway by providing a small, compact but durable truck, which will support the deflated tire and the associated wheel in a portable manner, so that the vehicle may be driven to a point where service can be obtained.

A further object of this invention is to provide an emergency flat tire truck or carriage, which will automatically grip upon and support a deflated tire and which will enable the disabled wheel to be easily run up or loaded thereon.

Another object of this invention is to construct a flat tire carriage, which can be easily placed in position to receive the disabled wheel and tire and which will lock the disabled wheel and tire in a cradle formed in the carriage to prevent accidental dislodgment of the disabled tire.

These and ancillary objects and structural features of merit are attained by this invention, the preferred embodiment of which is set forth in the following description and illustrated in the accompanying drawings, wherein:

Figure 1 is a view in perspective of an emergency tire truck or carriage, constructed in accordance with the principles of this invention;

Figure 4 is a longitudinal vertical sectional view taken on line 4—4 of Figure 3, and Figure 5 is a detailed transverse sectional view taken on line 5—5 of Figure 3.

In the accompanying drawings, the emergency tire truck or carriage 10, which is compactly and simply constructed, so that it may be easily stored in the trunk of a vehicle and lifted therefrom for ready use, includes a body portion 12. The body portion 12 is constructed from a single piece of suitable material and is formed in its upper face with an elongated longitudinally extending channel 14, which is curved transversely to conform to the contour or curvature of the cross sectional form of an ordinary pneumatic tire.

Figure 2:
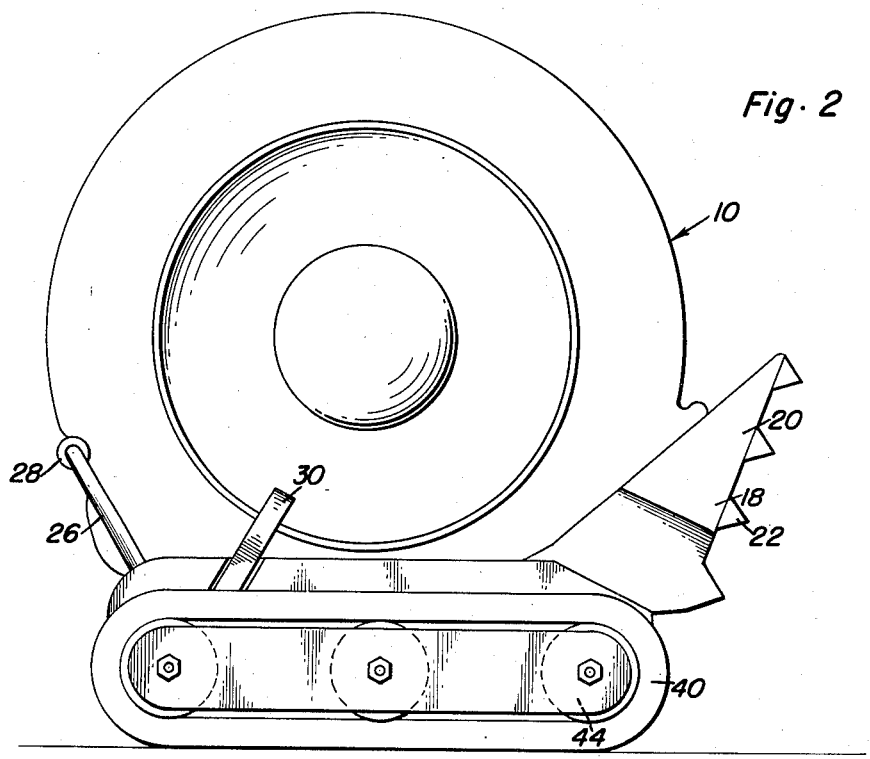
Figure 2 is a side elevational view of the truck or carriage, showing an automobile wheel with deflated tire mounted thereon.
Figure 3:
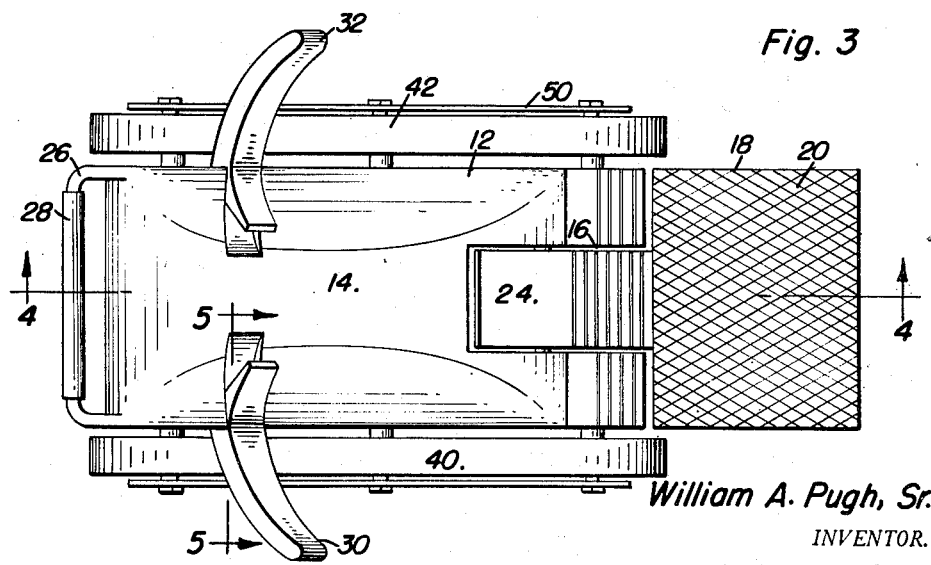
Figure 3 is a top plan view of the truck.

The opposing ends of the body are rounded and a rectangular opening 16 is formed in one end thereof. A ramp 18 is pivotally mounted on the end formed with the opening, the ramp including a plate 20, which is formed with a knurled upper surface and is provided with depending teeth 22, the teeth being provided to enable the tapered ramp to be securely anchored in the ground, when the wheels and deflated tire is driven thereon for loading or mounting in the channel. A reduced offset extension or tongue 24 is formed on the ramp and is disposed within the opening 16, the extension 24 serving to effect a swinging movement of the ramp proper upon loading of the tire in the channel so that the ramp functions as a stop to prevent rearward movement of the wheel and tire, as seen in Figure 2.

In this respect, a U-shaped rod 26 is mounted on the other end of the body portion and extends upwardly therefrom, the rod extending upwardly above the channel and having a resilient sleeve 28 formed on the web portion thereof. The rod functions as a rigid stop for the tire and wheel, as seen in Figure 2, so that after the wheel, carrying the disabled tire, is loaded in the channel, it is prevented from having a longitudinal movement, by the fixed stop and the movable stop, the latter being defined by the pivoted ramp.

Suitable means is also provided to clamp the disabled tire in the channel and includes a pair of arcuate arms 30 and 32, which are mounted at their lower ends in transverse slots 34, formed in the opposing marginal edges of the body portion. The arms are mounted in the slots by pivot pins 36 and are pivotally journaled on the body portion for vertical swinging movement transversely of the channel 14. As seen in Figure 5, the arms are formed at their journaled ends with angular extensions 38, the extensions being normally disposed within the channel 14 and extending upwardly therefrom. Thus, when the tire is loaded in the channel, the extensions are depressed to effect an inwardly cooperating swinging movement of the arms 30 and 32, whereby the arms clampingly engage on the opposing side walls of the tire and with the fixed and movable stops 26 and 20, securely lock the tire and wheel in the channel.

Suitable means may be provided for imparting portability to the truck or carriage and, for example, ground engaging belts 40 and 42 may be mounted on the opposing sides of the truck or body portion. Thus, longitudinally spaced transversely disposed shafts 44 are journaled in depending ears 46 formed on the underside of the body portion and are provided at their opposing ends with pulleys 48, the pulleys receiving the belt. A mounting plate 50 may be secured to the end of the shafts to permit tightening of the belt.

In use, the utility of the device can be best ascertained, with reference to Figure 2, wherein it can be appreciated that the disabled tire and attendants supporting wheel will be locked on the truck or carriage by means of the fixed stop and the pivoted ramp, together with the transversely swinging clamping arms 30 and 32. Thus, the wheel will be locked against movement from the channel and the vehicle may be driven under its own power to a point of service, since the disabled wheel will be borne by the truck or carriage and the belts 40 and 42, which lend portability thereto, will assure a constant and dependable traction for the disabled wheel.

Having described the invention, what is claimed as new is:

An emergency flat tire carriage comprising a body portion having an elongated channel formed in its upper surface forming a cradle to support a deflated rim mounted pneumatic tire, said channel being curved transversely to conform to the cross-sectional contour of the tire, a ramp pivotally mounted on one end of the body and having an offset extension formed on its inner end and aligned with said channel, a fixed upstanding stop on the other end of the body in alignment with the channel for supporting the tire with the ramp being swung upwardly upon loading of the tire to form a stop, a pair of arcuate arms pivotally mounted on the body for vertical swinging movement transversely of the channel, said arms having inner extensions disposed in the channel and extending upwardly therefrom to effect a cooperative inwardly swinging movement of the arms for clamping engagement of the side walls of the tire upon loading of the tire in the channel, shafts transversely journaled in the body, pulleys fixed on the opposing ends of the shafts and ground engaging belts connecting the pulleys on the opposite ends of the shafts, and means formed on the underside of the ramp for anchoring the ramp in the ground.

WILLIAM A. PUGH, Sr.

REFERENCES CITED

The following references are of record in the file of this patent:

UNITED STATES PATENTS

| Number | Name | Date |
| --- | --- | --- |
| 1,326,975 | Schneider | Jan. 6, 1920 |
| 2,226,521 | McNamara | Dec. 24, 1940 |
| 2,350,118 | Knapp | May 30, 1944 |
| 2,358,864 | Lockwood | Sept. 26, 1944 |
| 2,412,290 | Rieske | Dec. 10, 1946 |
| 2,437,811 | Folden | Mar. 16, 1948 |